United States Patent
O'Toole et al.

(10) Patent No.: US 12,085,315 B2
(45) Date of Patent: Sep. 10, 2024

(54) ELASTOCALORIC HEAT RECOVERY IN A HEAT PUMP / REFRIGERATION SYSTEM USING A PUMP MECHANISM

(71) Applicant: EXERGYN LTD., Dublin (IE)

(72) Inventors: Kevin O'Toole, Dublin (IE); Keith Warren, Dublin (IE)

(73) Assignee: EXERGYN LTD., Dublin (IE)

( * ) Notice: Subject to any disclaimer, the term of this patent is extended or adjusted under 35 U.S.C. 154(b) by 0 days.

(21) Appl. No.: 17/632,393

(22) PCT Filed: Aug. 2, 2020

(86) PCT No.: PCT/EP2020/071753
§ 371 (c)(1),
(2) Date: Feb. 2, 2022

(87) PCT Pub. No.: WO2021/023687
PCT Pub. Date: Feb. 11, 2021

(65) Prior Publication Data
US 2022/0357083 A1    Nov. 10, 2022

(30) Foreign Application Priority Data

Aug. 2, 2019  (GB) ...................................... 1911101
Aug. 2, 2019  (GB) ...................................... 1911112

(51) Int. Cl.
F25B 23/00    (2006.01)
F25B 30/00    (2006.01)

(52) U.S. Cl.
CPC .............. *F25B 23/00* (2013.01); *F25B 30/00* (2013.01)

(58) Field of Classification Search
CPC ....................................................... F25B 23/00
See application file for complete search history.

(56) References Cited

U.S. PATENT DOCUMENTS 4,353,218 A * 10/1982 Wheatley ................ F25B 30/00
                                                     62/118
10,018,385 B2 * 7/2018 Radermacher ........... C09K 5/10
(Continued)

FOREIGN PATENT DOCUMENTS

CN    106052190 A    10/2016
CN    107289668 A    10/2017
(Continued)

OTHER PUBLICATIONS

Machine translation of CN106052190 by Espacenet (Year: 2016).*
Machine English language translation of JP 2015068604 to Daikin Ind Ltd (translated Sep. 2023) (Year: 2015).

*Primary Examiner* — Christopher R Zerphey
(74) *Attorney, Agent, or Firm* — Nixon Peabody LLP

(57) ABSTRACT

The invention provides a heat pump system and method heat pump system comprising a first Shape-Memory Alloy (SMA) or Negative Thermal Expansion (NTE) elastocaloric material core positioned in a housing and adapted to change state in response a temperature change supplied by a fluid. A second Shape-Memory Alloy (SMA) or Negative Thermal Expansion (NTE) elastocaloric material core positioned in a housing and adapted to change state in response a temperature change supplied by the fluid. A pump mechanism connected in a fluid communication with the first core and second core and adapted to control delivery of the fluid to the first and second core.

4 Claims, 9 Drawing Sheets

(56) References Cited

U.S. PATENT DOCUMENTS

| | | |
|---|---|---|
| 10,119,059 B2 | 11/2018 | Cui et al. |
| 11,454,429 B2 * | 9/2022 | Bartholome .......... F03G 7/0614 |
| 11,656,008 B2 * | 5/2023 | Langan ................. F03G 7/0646 |
| | | 62/175 |
| 2016/0084544 A1 | 3/2016 | Radermacher et al. |
| 2016/0208783 A1 | 7/2016 | Cullen et al. |
| 2022/0299243 A1 | 9/2022 | O'Toole et al. |

FOREIGN PATENT DOCUMENTS

| | | |
|---|---|---|
| CN | 107421096 A | 12/2017 |
| EP | 3317535 B1 | 5/2018 |
| GB | 2497542 A | 6/2013 |
| GB | 2533357 A | 6/2016 |
| JP | 2015068604 | 4/2015 |
| WO | 2014198904 A1 | 12/2014 |
| WO | 2017001521 A1 | 1/2017 |
| WO | 2018229231 A1 | 12/2018 |

* cited by examiner

ELASTOCALORIC HEAT RECOVERY IN A HEAT PUMP / REFRIGERATION SYSTEM USING A PUMP MECHANISM

CROSS-REFERENCE TO RELATED APPLICATIONS

This application is a 35 U.S.C. § 371 National Phase Entry Application of International Application No. PCT/EP2020/071753 filed Aug. 2, 2020, which designates the U.S. and claims benefit under 35 U.S.C. § 119(a) of GB Application No. 1911101.2 filed Aug. 2, 2019 and GB Provisional Application No. 1911112.9 filed Aug. 2, 2019, the contents of which are incorporated herein by reference in their entireties.

FIELD

This disclosure relates to a heat pump. In particular this disclosure relates to a heat pump for heating systems and/or cooling systems such as an air conditioning/refrigeration system.

BACKGROUND

Heat Pump ("HP") technologies have gained wide commercial acceptance in heating, ventilation & air conditioning ("HVAC") applications. They can offer energy savings and emissions reductions and are typically installed for heating and cooling systems in buildings or car applications etc.

There are several types of heat pump. Most existing technologies utilise a refrigerant in an expansion/compression cycles, many heat pumps are classified by the source of the heat e.g. air source heat pump or ground source heat pump. The fundamental technology used in the heat pump is similar. Air source heat pumps have limited performance in cold temperature (at −18° C., CoP tends to be around 1 (due to Carnot) so electrical resistance heating is more effective, at higher operating temperatures the CoP can reach 4). Ground Source heat pumps have more stable inlet temperature but are limited by the Coefficient of Performance ("CoP") of present technology.

There is a global need to decarbonise heating and cooling in buildings. Heating generally uses combustion of carbon-based fuel, which releases carbon into the atmosphere. Cooling and air conditioning can be a major electrical load in warmer climates. Heat pumps can potentially deliver heating and cooling from a single package. If a heat pump uses renewable electricity, then it can be a zero-emission technology. Current heat pump technologies generally use refrigerants with high global warming potential and can have high toxicity, which is undesirable. Fans and pumps have a noise signature which can be intrusive. Current HP technology has a CoP of 3 to 4. By increasing the CoP, electricity consumption can be reduced, this reduces carbon emissions if non-renewable electricity is used. Moreover, conventional HP technologies can have a CoP which is affected by ambient air temperature which is undesirable. US Patent publication number US20160084544, Radermacher et al, discloses a heat pump system that uses SMA material tubes and are filled with other tubes or rods of an unknown material to take up volume and to therefore remove dead thermal mass to help boost the efficiency of the system. Chinese patent publication number CN 106 052 190 (Qian et al) discloses a refrigeration system that uses a SMA core comprising NiTi tubes. The fluid passes through the tubes and flow devices to increase the heat transfer and the cores need to be mechanically coupled together for work recovery, however this system suffers from poor performance.

The heat pump market is set to grow as heat pumps provide a clean alternative to fossil fuel heating technology and they are currently used in most air conditioning and refrigeration. Basic heat pumps cannot operate at part load and have poor efficiency in periods of part load demand. Cooling is a major energy demand and maximising efficiency for cooling has a significant impact on the costs of installing generator capacity and reinforcing grids. Use of inverter/variable speed drives improves part load performance but can increase the price of the product by up to 40%.

It is therefore an object to produce a heat pump system that produces a large increase in Coefficient of Performance (CoP). It is another object to provide an improved cooling system.

SUMMARY

According to the invention there is provided, as set out in the appended claims, a heat pump system and method comprising:
- a first Shape-Memory Alloy (SMA) or Negative Thermal Expansion (NTE) or elastocaloric material core positioned in a housing and adapted to change state in response a temperature change supplied by a fluid;
- a second Shape-Memory Alloy (SMA) or Negative Thermal Expansion (NTE) elastocaloric material core positioned in a housing and adapted to change state in response a temperature change supplied by the fluid; and
- a pump mechanism connected in a fluid communication with the first core and second core and adapted to control delivery of the fluid to the first and second core.

In one embodiment the pump mechanism is a positive displacement pump.

In one embodiment the pump mechanism is configured to allow a fixed volume of fluid travel between the first and second cores.

In one embodiment there is provided a fluid delivery system connected to the pump mechanism is configured to deliver fluid to the first and second core.

In one embodiment the fluid delivery system comprises a closed loop system.

In one embodiment the first and second cores are hydraulically coupled together. The hydraulic coupling allows for the cores to be positioned anywhere, which is more flexible and allows for multiple cores out of phase rather than two cores in antagonistic mode giving greater optimisation and better control.

In another embodiment of the system there is provided heat a pump system comprising
- a first Shape-Memory Alloy (SMA) or Negative Thermal Expansion (NTE) or elastocaloric material core positioned in a housing and adapted to absorb heat and store energy in response to a first fluid inputted at a first temperature. This has a net cooling effect on the first input fluid as it leaves the core;
- the housing is configured to receive the first fluid at a first temperature via an inlet to cause the first SMA or NTE or elastocaloric core to change state;
- a device is configured to apply stress on the first SMA or NTE core in the housing to cause the SMA or NTE or elastocaloric core to undergo a phase change and exothermically release heat/energy. This causes the SMA or NTE core to increase in temperature. A second fluid at a second temperature (or the continuation of the first fluid at the first temperature in certain cases) is then inputted to the core, and energy/heat from the heated SMA or NTE or elastocaloric core is transferred in to the fluid. This has a net heating effect as the fluid leaves the core; and an outlet of the hydraulic chamber (used to apply the stress on the SMA/NTE/elastocaloric core) connected to a heat exchanger, wherein the heat exchanger is configured to receive the hydraulic fluid and receive heat generated in the hydraulic fluid due to it doing work when a stress is applied and fed into the heat exchanger.

A problem that is solved by the present invention is that the system provides increased efficiency/CoP of an SMA/solid state heat pump actuated by a hydraulic transmission system via utilisation of waste heat in the hydraulic oil circuit. An extra benefit lies in the increased exergetic efficiency of the system by requiring a lower deltaT to be ascertained by energy transfer from the SMA/solid state material to the heat pump fluid, and the increased efficiency of the hydraulic circuit by maintaining the correct operating temperature for the oil.

It will be appreciated the system allows variation of flow rate, cycle time, rate or pressure change, actual pressure change, number of cores used, and can be optimised for output, efficiency, deltaT, etc. A control module can be provided, with a known demand, so that the system can optimise the output for multiple scenarios, so is the demand is x % of full load, a map of settings (similar to an engine map) can be used to look up the ideal operational settings to give best performance. This enables the efficiency curve to be quite flat even at part load (i.e. <50%). This increased part load efficiency will offer significant operating cost reduction to the end user.

In one embodiment the device is arranged in communication with the core and provides a temperature lift during a heating cycle when the heat from the second fluid and heat from the device is combined.

In one embodiment the device comprises a hydraulic transmission system.

In one embodiment the hydraulic transmission system comprises hydraulic oil such that the temperature of the hydraulic fluid increases when a stress is applied by the hydraulic transmission system.

In one embodiment/state the hydraulic transmission system comprises a closed loop hydraulic fluid circuit having a hydraulic pump configured to pump hydraulic fluid through the heat exchanger at the same time as the second heat transfer fluid from the heat pump circuit.

In one embodiment/state the pump is configured to prevent fluid from the heat pump circuit entering the heat exchanger when its temperature is below that of the hydraulic fluid.

In one embodiment a valve is configured to prevent the first fluid entering the heat exchanger when the core is absorbing heat.

In one embodiment the core changes state via stress application and subsequently a second fluid temperature increases in temperature.

In one embodiment the heat exchanger is configured to output a combination of the heat generated from the second fluid and the heat generated in the hydraulic circuit.

In another embodiment there is provided a cooling system comprising a first Shape-Memory Alloy (SMA) or Negative Thermal Expansion (NTE) or elastocaloric material core positioned in a housing and adapted to change state in response a temperature change supplied by a fluid;

a second Shape-Memory Alloy (SMA) or Negative Thermal Expansion (NTE) or elastocaloric material core positioned in a housing and adapted to change state in response a temperature change supplied by the fluid; and a pump mechanism connected in a fluid communication with the first core and second core and adapted to control delivery of the fluid to the first and second core.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

Figure 1:
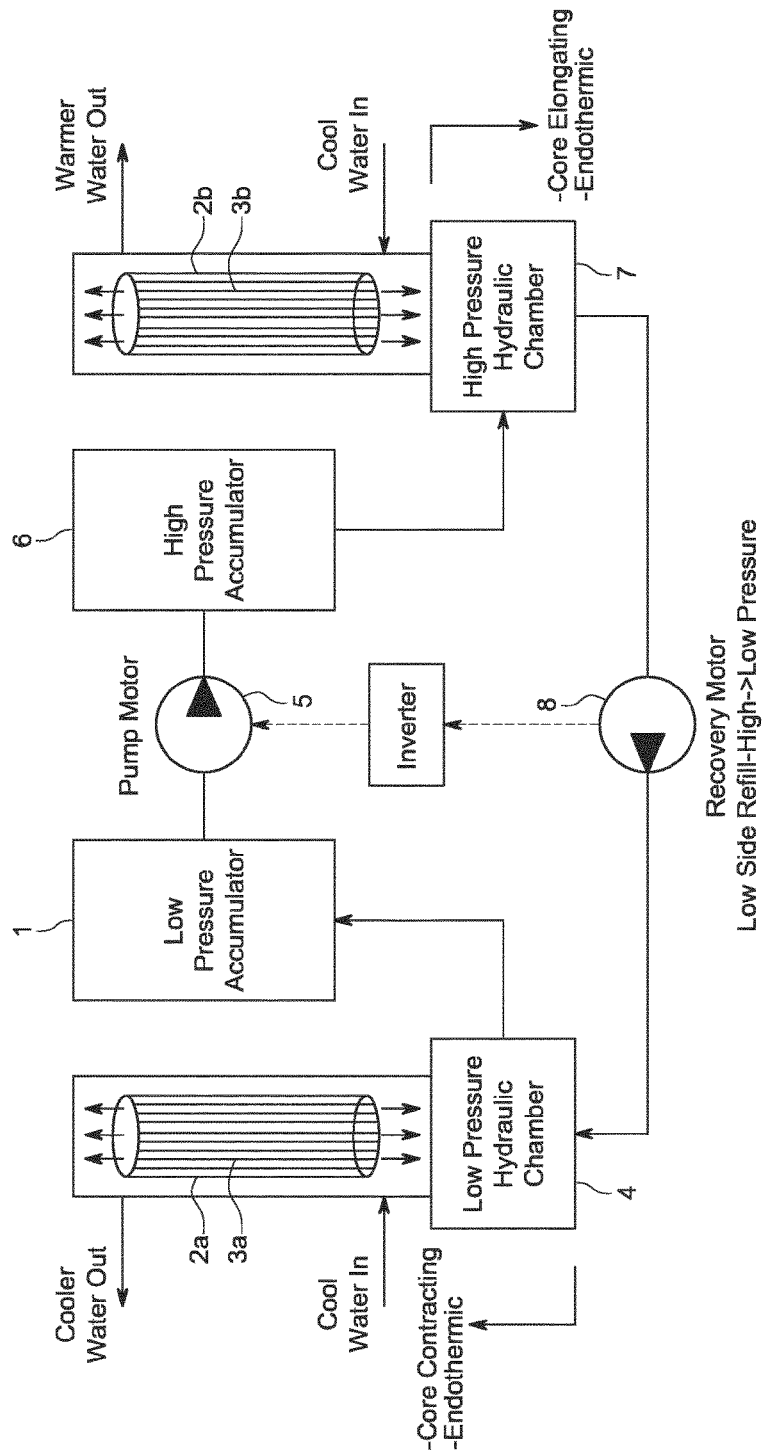
FIG. 1 illustrates a heat pump system incorporating a mechanical configuration of SMA or NTE or elastocaloric cores and a transmission system.

The invention relates to a new heat pump cycle which utilises the latent heat from a phase transformation of shape memory alloys ("SMA") or Negative Thermal Expansion materials (NTE) or elastocaloric materials. The following description of a preferred embodiment of the invention describes a SMA implementation and equally applies to Negative Thermal Expansion materials (NTE) or elastocaloric material implementations.

The invention can use a particular SMA configuration made up of a plurality of elements wires, plates, ribbons packed closely together to define a core. SMA material can exist in at least two crystalline states, martensite austenite, R-phase, and can be reversibly converted from one phase to the other. The austenite to martensite transition of SMA is exothermic. The martensite to austenite transition is endothermic. The temperatures at which the phase change occurs can be manipulated via the application of stress to the SMA material.

A Shape-memory Alloy (SMA) is an alloy that exhibits a shape memory effect which once deformed returns to its pre-deformed shape upon heating. This material is a lightweight, solid-state alternative to conventional actuators such as hydraulic, pneumatic, and motor-based systems.

The invention relates to a heat pump system and method which can use either Shape-Memory Alloys (SMAs) or Negative Thermal Expansion materials (NTE) or elastocaloric materials. In one embodiment a particular SMA system made up of SMA material can be used. For example a plurality of elements (or a plurality of groups of elements) or wires packed closely together to define a core. In another example the core can be made up of one or more of the following rod, block, ribbon, strip or plates, 3D printed elements and the like all capable of being subjected to compression, axially or laterally, compression and natural loading, torsional stress to function as a core.

A heat pump has two individual phases—heat absorption and heat release. The machine cycle is defined as a full heat absorption phase (endothermic) and a full heat release phase (exothermic).

The heat absorption phase allows for the transfer of heat into the SMA material by setting the stress applied to the material to an appropriate value, the lower value used in the cycle of operation. This results in the activation temperatures, austenite start ($A_s$) and austenite finish ($A_f$), being set to a value below the input temperature of fluid stream. The thermal gradient present therefore allows the heat to transfer into the SMA via conduction and convection. Once the material has fully or partially transformed to austenite (i.e. the temperature of the SMA material is above $A_f$), the heat absorption phase is complete.

The heat release phase begins after increasing the stress on the austenitic SMA material. This raises the activation temperatures, martensite start ($M_s$) and martensite finish ($M_f$), for the reverse transformation back to martensite. Once the value of $M_s$ is raised above the input fluid stream temperature, the reverse transformation begins. It will only complete in full when $M_f$ also raised above the fluid stream temperature. The latent heat is then released by the SMA material and into the fluid stream, raising its temperature. The rate at which the release of heat occurs is a function of the thermal gradient and various thermodynamic conditions of the fluid stream, such as flow rate, turbulence etc.

A single fluid temperature input can be used in the system, and a series of valves can be used at the output of the chamber to direct the colder fluid flow from the heat absorption phase back to source, while directing the warmer fluid from the heat release phase to the heating target. Multiple working fluid temperature inputs can also be used.

FIG. 1 illustrates a Heat Pump system incorporating a known SMA drive engine configuration but operated in reverse and described in unpublished PCT patent application number PCT/EP2019/052300, assigned to Exergyn Limited, and fully incorporated herein by reference.

Figure 2:
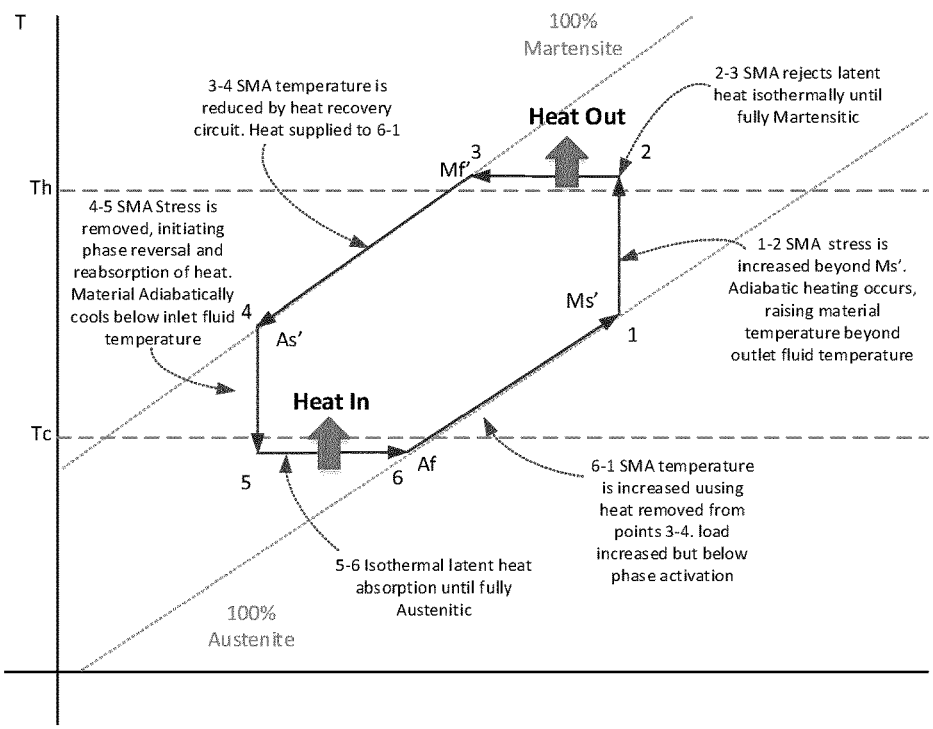
FIG. 2 shows an ideal temperature-entropy diagram for an elastocaloric heat pump cycle illustrating the operation cycle according to one embodiment of the invention.

FIG. 2 shows an ideal temperature-entropy diagram for an elastocaloric heat pump cycle illustrating the operation cycle according to one embodiment of the invention. The cycle removes heat from a Heat transfer fluid (HTF) at temperature Tc between point 5-6 and rejects heat to a higher temperature fluid Th between point 2-3. Heat is absorbed by heat recovery circuit between point 3-4 causing the material to cool and reabsorbed by the material between 6-1 causing it to heat.

Figure 3:
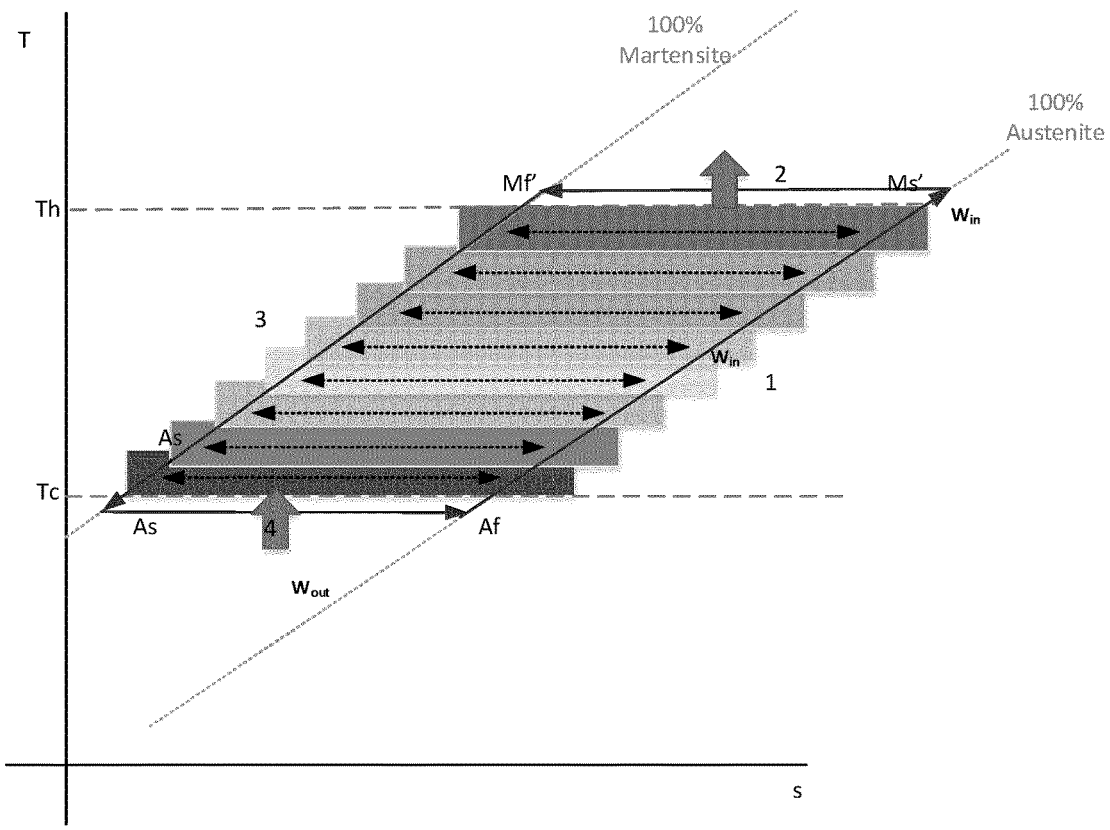
FIG. 3 illustrates an ideal operation cycle of FIG. 2 in terms of multiple fluids at different temperatures showing an ideal Stirling cycle.

It is desirable if the Elastocaloric cycle can operate more efficiently where the cycle operates closer to the Stirling cycle. This is very difficult to achieve due to physical limitations of the heat recovery stream. This is because the third stream would actually need to be multiple streams each of different temperature as shown in FIG. 3 which would require the need for multiple values and multiple fluids at different temperatures changes.

The solid-state/SMA heat pump cycle can be described thermodynamically as a reverse Brayton/reverse Stirling hybrid cycle. Therefore, the maximum attainable CoP that can be generated from the cycle is indirectly proportional to the desired temperature lift from the cold stream to the hot stream (deltaT). By reducing this deltaT, a higher CoP can be achieved as there is more usable available energy (exergy) in the SMA/solid state material that can be transferred to the fluid.

Figure 4:
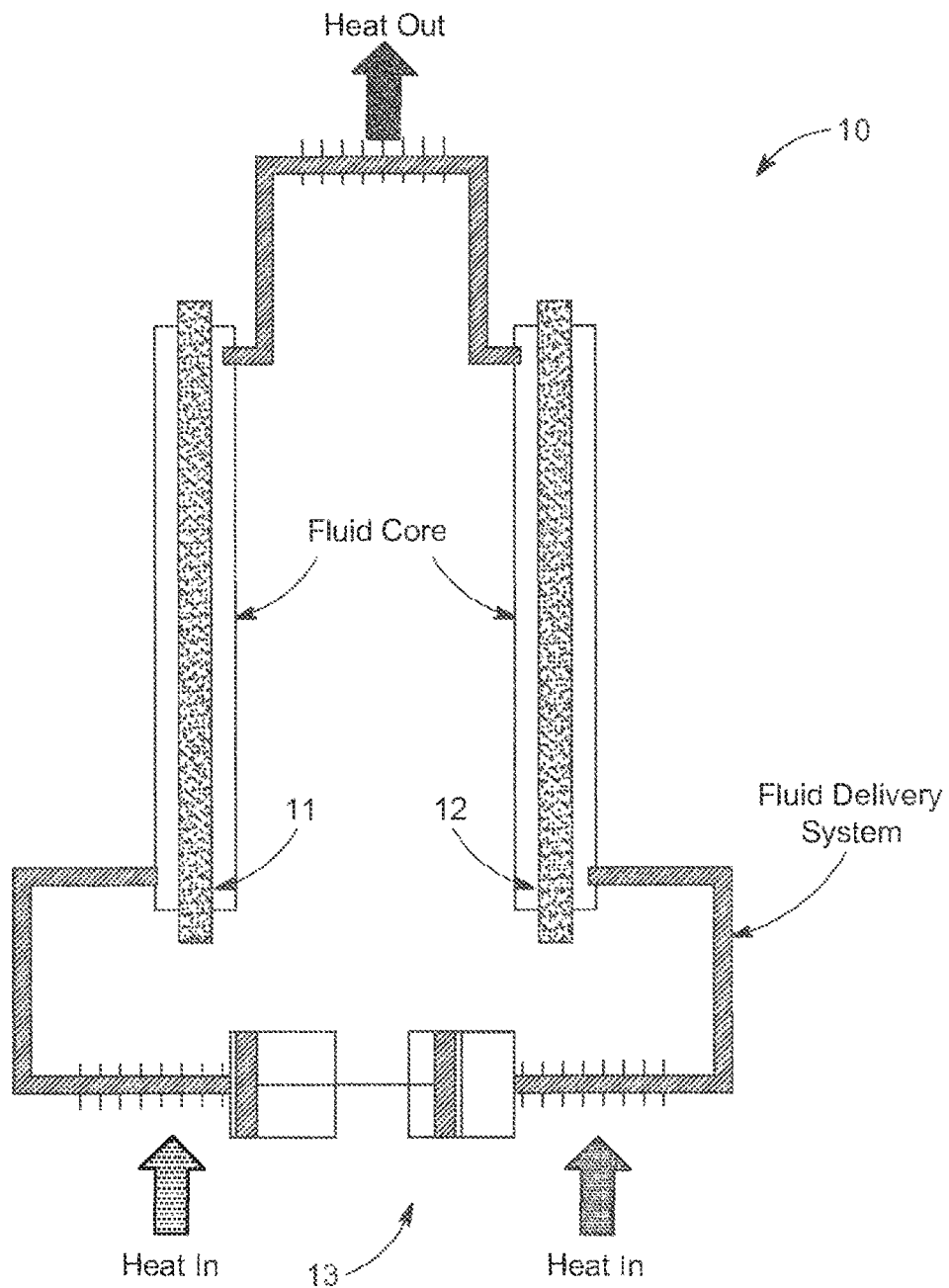
FIG. 4 illustrates a heat pump comprising a pump mechanism connected in a fluid communication with a first core and a second core and adapted to control delivery of the fluid to the first and second core according to one embodiment of the invention.

In order to achieve a cycle which is closer to a Stirling cycle the invention provides a single stream fluid network system. An exemplary setup for a double fluid core setup is shown in FIG. 4 according to preferred embodiment of the invention showing a heat pump system indicated generally by the reference numeral 10. The heat pump system 10 comprises at least two cores 11, 12 which contain SMA or NTE or elastoric material. These cores 11, 12 are supplied a heat transfer fluid by a pump mechanism 13, for example a positive displacement pump which allows a fixed volume of fluid to be moved forward and backwards through the cores 11, 12.

FIGS. 5 to 8 illustrate operation of the invention according to one embodiment of the invention and illustrates various stages of the first and second SMA core activation. The invention provides a heat pump system and method comprising a first Shape-Memory Alloy (SMA) or Negative Thermal Expansion (NTE) or elastocaloric material core 11 positioned in a housing and adapted to change state in response a temperature change supplied by a fluid. A second Shape-Memory Alloy (SMA) or Negative Thermal Expansion (NTE) or elastocaloric material core 12 positioned in a housing and adapted to change state in response a temperature change supplied by the fluid. A pump mechanism 13 connected in a fluid communication with the first core and second core and adapted to control delivery of the fluid to the first and second core 11, 12. The system is preferably an enclosed unit system.

Figure 5:
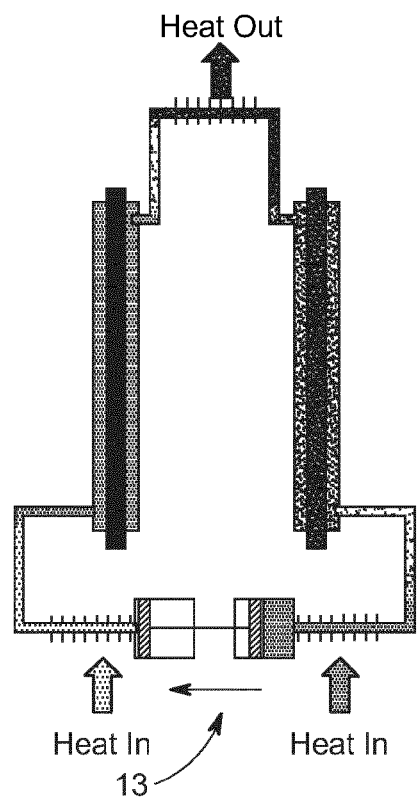
FIGS. 5 to 8 illustrate operation of the invention according to one embodiment of the invention and illustrates various stages of the first and second core activation.

Referring to FIG. 5 the SMA in one core is unloaded and therefore cools which causes it to absorb heat and make the fluid surrounding it decrease in temperature. This is represented by the left core 11. The right core 12 is loaded which causes heat to be rejected and therefore heats the fluid surrounding it. Compression loading is preferred over tension loading as it increases the fatigue life of the material and delivers a more complete phase change transition, thus delivering a much higher efficiency. The stressing of the core can be provided by a hydraulic circuit, pneumatic, electro-mechanical or screw thread device arrangement configured to apply a stress to the core. Heat is rejected at the top of FIG. 5 and absorbed at the bottom. The fluid held in the fluid delivery system outside of the core is a gradient between the hot and cold temperature. The positive displacement pump is fully extended to the left.

Figure 6:
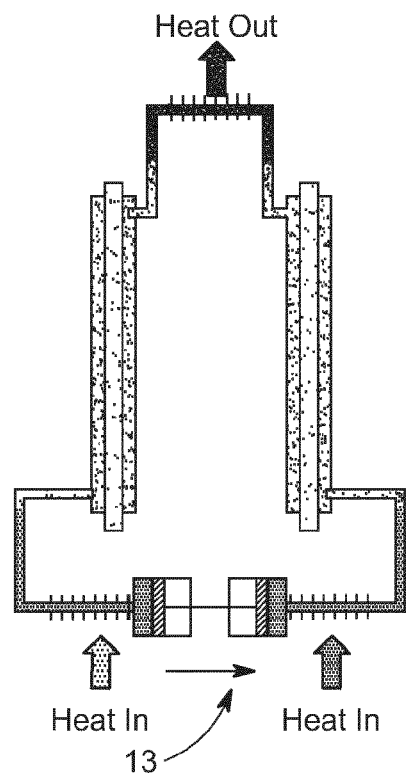

At the second stage of the process, as shown in FIG. 6, the pump 13 begins to move to the right. This causes the cooled fluid in the left core to move down and out of the core to a region in the fluid delivery system where it can reabsorb heat. This is replaced by a gradient of higher temperature fluid which raises the SMA temperature. The heated fluid in the right core 12 is pushed out to the region of the fluid delivery circuit where heat can be rejected. Similar to the left core, gradient of lower temperature fluid which decreases the SMA material temperature.

Figure 7:
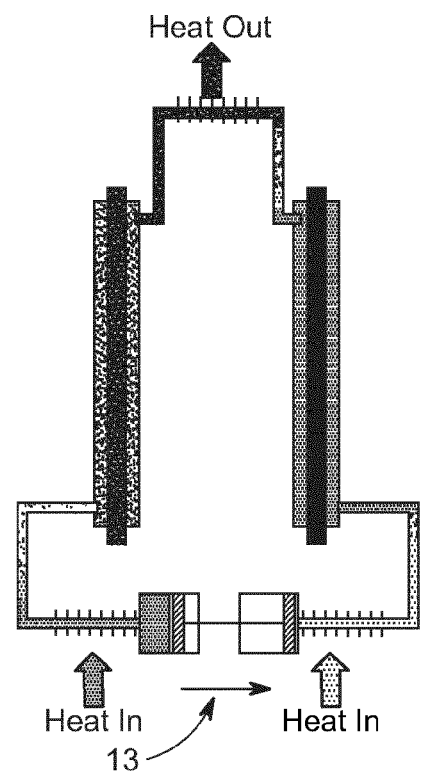

At the third stage, as shown in FIG. 7, the pump 13 is extended fully to the right which causes the hottest temperature fluid to occupy the left core and the coldest to occupy the right. The SMA material is loaded in the left core causing heat rejection from the material to fluid and is unloaded on the right causing heat absorption and cooling of the fluid.

Figure 8:
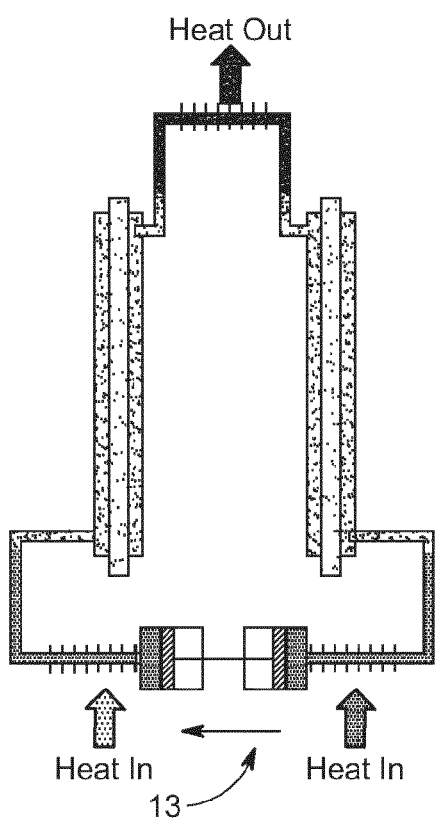

The fourth stage, as illustrated in FIG. 8, is similar to the second stage where the pump reverses direction but in this case the cool fluid in the right core moves down and out of the core to reabsorb heat while the left core displaces fluid out for heat to be rejected. The right core fluid is replace with a gradient of higher temperature fluid which raises the SMA temperature while the left is replaced with gradient of lower temperature fluid which reduces the SMA temperature.

At this point the cycle repeats back to stage one. It can be seen that this cycle matches closer to an ideal cycle as the third stream consist of a temperature gradient rather and fluid stream in between the hot and cold. Also system complexity has been reduced as no valves are required.

Alternative Embodiment

Figure 9:
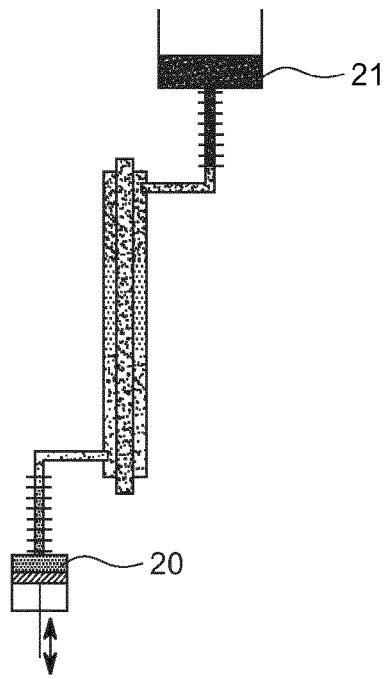
FIGS. 9 to 11 illustrates an alternative embodiment having multiple hydraulic cavities in a multi-core system for load sharing and energy recovery.

Moving the sample material can be difficult before loading of the core. One option is to move the fluid temperature gradient across the material with a positive displacement pump, as shown in FIG. 9. In this case the material is fixed in a tube with an appropriate cavity to minimize temperature gradients. The fluid can be easily loaded from bth ends. A piston pump 20 is located at the bottom of the fluid network. When it moves up, it pushes fluid to a hot sink 21 for heat to be rejected. And when it moves down fluid is drawn down into the cold source.

Figure 10:
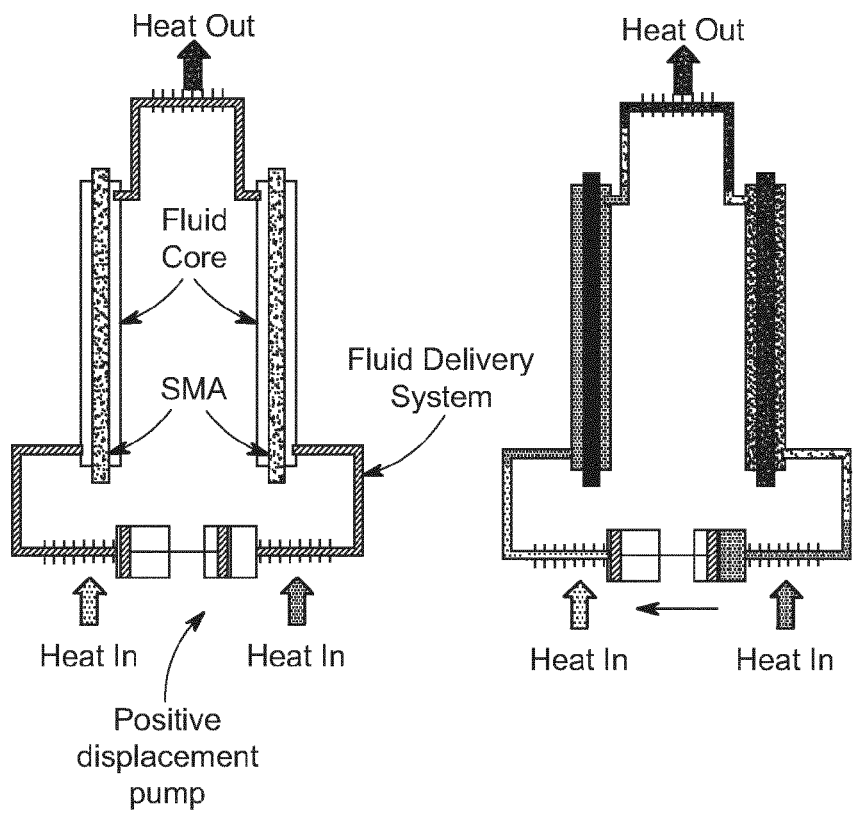

FIG. 10 shows a possible configuration for a twin core setup. A single pump is used but with double pistons. As the pump moves to the right heat is being supplied to the heat sink from the right core and the left core is providing fluid to the cold source. When the pump moves to the left heat is supplied from the left core to the heat sink and the right core fluid is brought to the cold source. Therefore, the heat sink is almost constantly being provided with a supply.

Figure 11:
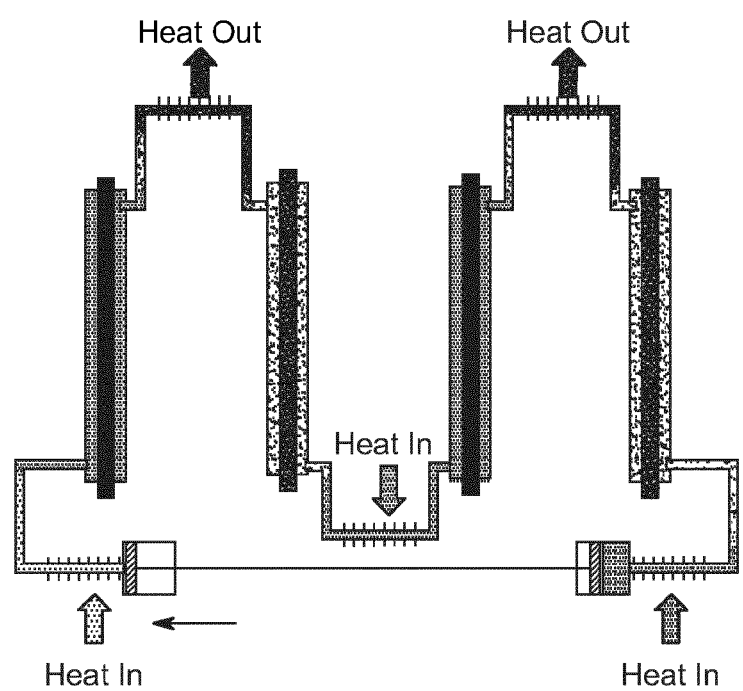

FIG. 11 illustrates a four-core system. As can be seen, as the number cores have increased the number of pumps has not. The system now has two heat rejection areas; however, these regions can be positioned at a central location.

The systems shown with fixed displacement pistons can be modified to further increase system efficiency and performance. To improve heat transfer into and out of the SMA, the working fluid (if a gas) will allow dynamic manipulation of the pressure and volume, much like a Stirling engine/ reverser Stirling heat pump/refrigerator. The gas can be dynamically cooled by reducing pressure, and dynamically heated by compressing the gas. If this is done at specific points in the cycle, and in phase with the SMA heating and cooling, coupled with the SMA phase changes occurring when little or zero gasflow is taking place then the system can be optimised. In the case of a Stirling this would typically be achieved with the hot and cold pistons 90 degrees out of phase, but further study may identify an SMA heated/cooled system that would be more efficient at other phase angles. The SMA would be placed between the hot and cold cylinders for instance in an alpha type Stirling configuration as one incarnation.

A regenerator in the system would be required to maximise efficiency, and it may be required to have the actual SMA as the regenerator, or separate passive regenerators on the SMA hot end, cold end, or both.

FIGS. 9 to 11 simplifies the operational of a solid-state heat pump/refrigerator by significantly reducing the number of operating valves when compared to concepts utilising tertiary circuits to perform heat recovery. Additionally, this type of flow regime over the core allows for maximum heat recovery which allows for a greater CoP. It will be appreciated that suitably an oscillating working fluid with fixed volume in order to create a physical incarnation of the ideal Ts diagram cycle is provided. The application of an oscillating working fluid with varying pressure and volume during a cycle, and with a regenerator included, provides a hybrid SMA-reverse Stirling engine type of cycle.

Figure 12:
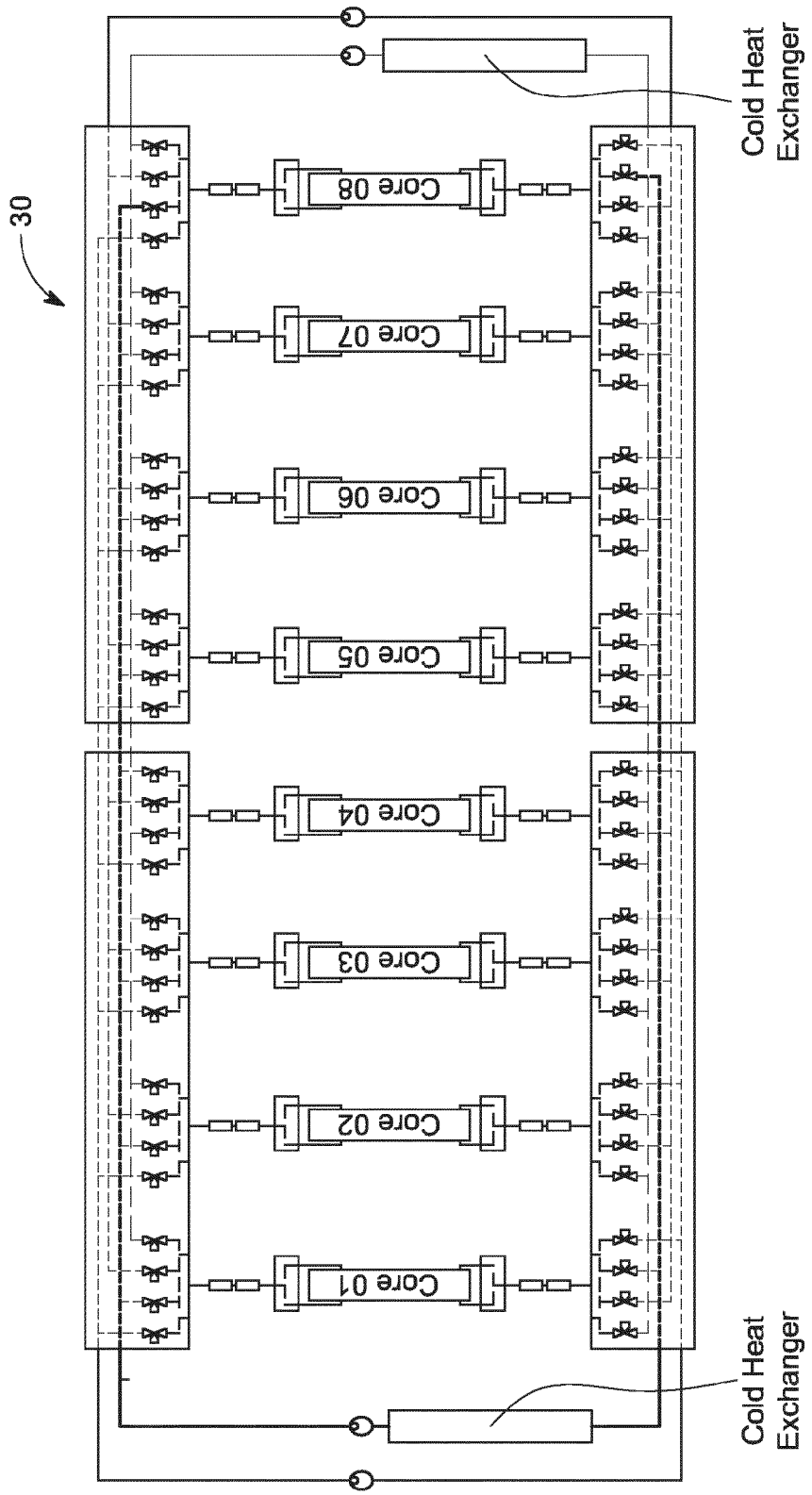
FIG. 12 illustrates an example of a two-stream intermediate system with eight operating cores according to another embodiment of the invention.

FIG. 12 illustrates an example of a two stream intermediate system with eight operating cores indicated by the reference 30. In this system each core is operated 45° out phase. The advantage of this setup compared to the single stream approach previously discussed is that each intermediate circuit passes over a single core. This significantly reduces pressure losses in the system which reduces the potential for mixing between streams at the valve interface. There are a number of ways the embodiment shown in FIG. 12 can be operated. In one version the cycle can be operated such that the inlet valve timing to the core is sequenced as:
1. Hot
2. Intermediate Cold
3. Cold
4. Intermediate Hot An outlet valve timing does not necessarily need to match this sequence. Instead the cycle may be operated to allow hotter fluid to enter the intermediate hot circuit and colder fluid to enter the intermediate cold circuit. This can be controlled using valve timing offset sets or active temperature monitoring or both. This allows the largest temperature delta to be provided to each core which helps to reduce cycle time, while maintaining the temperatures in the intermediate circuits.

Alternatively the valve timing could be sequenced to following the theoretical cycle shown in FIG. 2. Such a sequence would operate as:
1. Hot
2. InterHot
3. InterCold
4. Cold
5. InterCold
6. InterHot
7. Hot The advantage of such operation is that the configuration introduces a lower DT fluid to the core in order avoid excessive destruction of heat. The outlet valves can be operated in the same fashion as the previous sequence described.

HEAT PUMP EMBODIMENT WITH COMPRESSION

The solid-state/SMA heat pump cycle can be described thermodynamically as a reverse Brayton/reverse Stirling hybrid cycle. Therefore, the maximum attainable CoP that can be generated from the cycle is indirectly proportional to the desired temperature lift from the cold stream to the hot stream (deltaT). By reducing this deltaT, a higher CoP can be achieved as there is more usable available energy (exergy) in the SMA/solid state material that can be transferred to the fluid.

Figure 13:
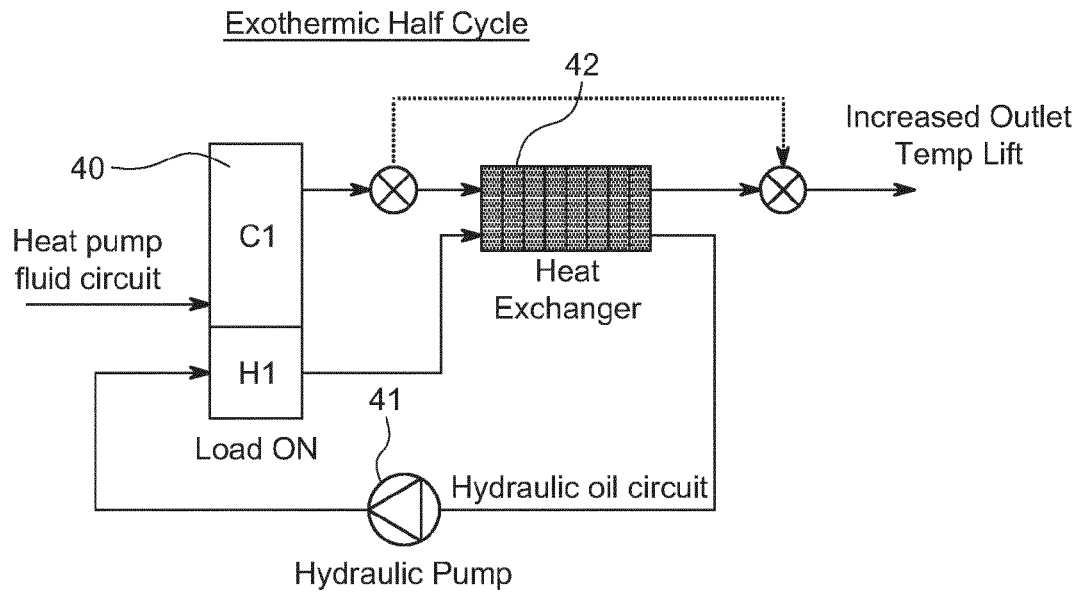
FIG. 13 illustrates an embodiment of the present invention showing a core, C1, connected to a device to stress the core and both connected to heat exchanger and closed loop system to provide a heated fluid to a heat exchanger.
Figure 14:
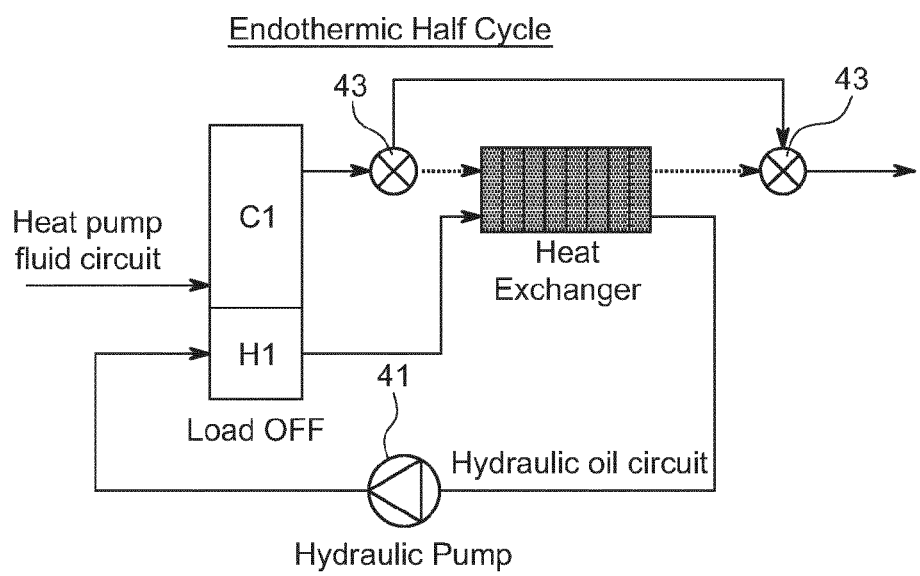
FIG. 14 illustrates a similar embodiment to FIG. 13 showing operation in a reverse cooling cycle.

FIG. 13 illustrates an embodiment of the present invention showing a core 40, C1, connected to a device 41 to stress the core, H1, and both connected to heat exchanger 42 and in a closed loop system to provide a heated fluid to a heat exchanger in an exothermic half cycle. The Shape-Memory Alloy (SMA) or Negative Thermal Expansion (NTE) or elastocaloric core 40 can be positioned in a housing and adapted to absorb heat and store energy in a first fluid inputted at a first temperature in response to a stress being applied to the C1. This is illustrated in FIG. 14 where a first fluid is pumped into the housing and core 41 where the core absorbs heat, which effectively shows an endothermic half cycle. The housing is configured to receive the first fluid at a first temperature via an inlet. A device, H1 is configured to apply stress, for example a compression stress, on the SMA or NTE core in the housing to cause the SMA or NTE core to change state. The second fluid at a second temperature (or the first fluid at the same temperature in certain cases) can be used to absorb the heat from the core following its exothermic portion of the cycle. During this state the outlet is connected to a heat exchanger, wherein the heat exchanger is configured to receive the second fluid at elevated temperatures and in parallel to receive heat generated in the hydraulic circuit as a result of work done when a stress is applied. This is also fed into the heat exchanger.

The invention outlines a system and method to recover additional heat from an attached hydraulic transmission system used to apply the requisite loading to the SMA/solid state material during the exothermic half of the cycle. By doing work on the core when a compression stress is applied, the hydraulic fluid gains heat, which must be removed from it in order to keep it at its desired and most efficient operating temperature. This is typically dumped to air or cooling fluid via a heat exchanger or similar. In the case of the present invention, the heated hydraulic fluid is used to boost the temperature of the heat pump outlet fluid temperature coming from the heat pump. This means that the deltaT required to be generated from the exothermic half cycle of the core can be reduced, increasing is exergetic efficiency. The additional 'top up' of heat can be supplied by the waste heat from the hydraulic fluid via a heat exchanger between the hydraulic fluid loop and the heat pump fluid loop.

The heat boost from the hydraulic circuit is only applied during the exothermic cycle. During the endothermic cycle, when the hydraulic pressure is removed, there is no heat gain in the fluid circuit. It is therefore necessary to by-pass the heat exchanger during the endothermic half of the cycle which can be achieved using a valve 43 as shown in FIG. 14.

This system can be designed for multiple cores acting out of phase or in phase. For systems with cores acting out of phase, there is a constant requirement to keep the hydraulic fluid cooled. Therefore the control system needs to track those cores undergoing an exothermic half cycle in order to supply the heat boost as required.

The effectiveness of the heat boost is a function of the deltaT between the hydraulic fluid temperature and the heat pump circuit fluid temperature. For systems with a large deltaT, more heat can be extracted from the hydraulic fluid and transferred into the heat pump circuit fluid. The system becomes less effective at boosting heat as the hydraulic fluid temperature and heat pump circuit fluid temperature become closer. Once the heat pump fluid temperature is above the hydraulic fluid temperature, the approach is detrimental as heat would be undesirably removed from the fluid circuit.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A heat pump system comprising
a first Shape-Memory Alloy or Negative Thermal Expansion or elastocaloric material core positioned in a housing and adapted to change state in response to at least one of heat supplied by a fluid and a stress applied to the first core;
a second Shape-Memory Allow or Negative Thermal Expansion or elastocaloric material core positioned in a housing and adapted to change state in response to at least one of heat supplied by the fluid and a stress applied to the second core; and
a pump mechanism connected in a fluid communication with the first core and second core and adapted to control delivery of the fluid to the first and second core wherein the pump mechanism is configured to allow a fixed volume of the fluid to travel between the first and second cores and the first core and the second core are hydraulically coupled together;
wherein the pump mechanism is configured to deliver a fixed volume of fluid to each of the first core and the second core increasing the stress applied to each of the first core and the second core such that an activation temperature of each of the first core and the second core is raised;
and wherein the stress applied to the first core is independent of the stress applied to the second core.

2. The heat pump system of claim 1 wherein the pump mechanism is a positive displacement pump.

3. The heat pump system as claimed in claim 1 comprising a fluid delivery system connected to the pump mechanism configured to deliver the fluid to the first and second core.

4. The heat pump system as claimed in claim 1 wherein the fluid, the pump mechanism and the first and second cores comprise a closed loop system.

* * * * *